(12) United States Patent
Panhelleux et al.

(10) Patent No.: US 6,572,169 B2
(45) Date of Patent: Jun. 3, 2003

(54) DEVICE COMPRISING A REMOVABLE CENTRAL CONSOLE

(75) Inventors: Jérôme Panhelleux, Paris (FR); Thierry Marceau, Rueil-Malmaison (FR); Marie-Claire Feyel, Versailles (FR); Philippe Barre, Meru (FR); Laurent Carrencotte, Meru (FR); Jean-Pierre Morel, Meru (FR); Richard Reant, Meru (FR)

(73) Assignee: Sai Automotive Allibert Industrie (FR)

( * ) Notice: Subject to any disclaimer, the term of this patent is extended or adjusted under 35 U.S.C. 154(b) by 0 days.

(21) Appl. No.: 10/106,798

(22) Filed: Mar. 27, 2002

(65) Prior Publication Data

US 2002/0145023 A1 Oct. 10, 2002

(30) Foreign Application Priority Data

Mar. 30, 2001 (FR) .............................. 01 04356

(51) Int. Cl.$^7$ .............................. B60P 3/05; B60N 3/12
(52) U.S. Cl. ..................................... 296/24.1; 296/37.8
(58) Field of Search .......................... 296/24.1, 37.12, 296/37.1, 37.8, 37.14; 49/181, 441, 176, 149; 224/926, 281, 548

(56) References Cited

U.S. PATENT DOCUMENTS

| | | | | |
|---|---|---|---|---|
| 4,427,246 A | * | 1/1984 | MacDonald | 312/334.43 |
| 4,796,791 A | * | 1/1989 | Goss et al. | 224/926 |
| 4,951,820 A | * | 8/1990 | Ackeret | 206/387.12 |
| 5,338,081 A | * | 8/1994 | Young et al. | 296/37.14 |
| 5,385,102 A | * | 1/1995 | Villedieu et al. | 104/2 |
| 5,544,722 A | * | 8/1996 | McKenzie | 187/410 |
| 5,678,875 A | * | 10/1997 | Zipperle et al. | 296/37.8 |
| 5,924,180 A | * | 7/1999 | Lindner et al. | 26/89 |
| 5,960,967 A | * | 10/1999 | Neil | 211/94.01 |
| 6,024,395 A | * | 2/2000 | Kang | 296/37.8 |
| 6,027,194 A | * | 2/2000 | Fleisch | 312/348.4 |
| 6,039,421 A | * | 3/2000 | Fulterer | 312/333 |
| 6,065,729 A | * | 5/2000 | Anderson | 224/926 |
| 6,135,529 A | * | 10/2000 | De Angelis et al. | 296/37.8 |
| 6,155,626 A | * | 12/2000 | Chabanne et al. | 296/65.03 |
| 6,203,088 B1 | * | 3/2001 | Fernandez et al. | 296/24.1 |
| 6,244,648 B1 | * | 6/2001 | Gackstatter | 296/37.8 |
| 6,338,517 B1 | * | 1/2002 | Canni et al. | 296/37.8 |
| 6,354,415 B1 | * | 3/2002 | Le Calve | 192/45.1 |
| 6,367,857 B2 | * | 4/2002 | Kifer et al. | 296/24.1 |
| 6,497,441 B1 | * | 12/2002 | Mahmood et al. | 296/24.1 |
| 6,499,785 B2 | * | 12/2002 | Eguchi | 296/37.8 |
| 6,511,115 B2 | * | 1/2003 | Koepff et al. | 296/24.1 |
| 2001/0030436 A1 | * | 10/2001 | Kifer et al. | 296/24.1 |
| 2002/0163215 A1 | * | 11/2002 | Emerling et al. | 296/24.1 |

FOREIGN PATENT DOCUMENTS

| | | |
|---|---|---|
| CA | 2245311 | 2/1999 |
| DE | 296 11 382 U1 | 12/1997 |
| DE | 296 11 382 | * 12/1997 |
| FR | 2 789 641 | * 8/2000 |
| FR | 2 789 641 A1 | 9/2000 |
| GB | 2 245 869 | * 1/1992 |
| JP | 57-164821 | * 10/1982 |
| JP | 09109778 | 4/1997 |

* cited by examiner

Primary Examiner—Kiran Patel
(74) Attorney, Agent, or Firm—Rothwell, Figg, Ernst & Manbeck

(57) ABSTRACT

A device for the passenger compartment of a motor vehicle comprising a central console. The device further comprises a slideway intended to be fixed to the passenger compartment of the vehicle, extending in a longitudinal direction of elongation, and having a lateral opening also extending in that longitudinal direction, and guiding and retaining structure sliding within the slideway, the guiding and retaining structure extending through the lateral opening and being linked to the console.

10 Claims, 3 Drawing Sheets

FIG_1

DEVICE COMPRISING A REMOVABLE CENTRAL CONSOLE

BACKGROUND OF THE INVENTION

The present invention concerns a device for the passenger compartment of a motor vehicle comprising a central console.

Such a device, intended to be arranged between the seats, in particular between the front seats, serves especially for storage or support.

The document CA-A-2 245 311 describes such a device comprising, in addition to the central console, a slideway intended to be fixed to the floor of the vehicle and guiding and retaining means sliding within the slideway. The slideway extends in a longitudinal direction of elongation and has a lateral opening also extending in that longitudinal direction. Said guiding and retaining means extend through said lateral opening and are linked to the console.

SUMMARY OF THE INVENTION

The aim of the invention is to improve the functionality of the central console, while proposing a simple and therefore less troublesome device, easy to use and robust. In order so to do, the invention proposes that said guiding and retaining means are movable with respect to the slideway between a retaining position in which they are maintained within the slideway and a removal position permitting disconnection from the slideway by passing through said lateral opening.

Thus, the passenger compartment of the vehicle can be modified more by removing the central console. In addition, the fact of passing the guiding and retaining means laterally through said opening makes it possible on the one hand to leave only the slideway remaining in place in the vehicle and on the other hand to embed the slideway in the floor of the vehicle. Consequently, this solution makes it possible to benefit fully from the space freed by the console and to avoid damaging the guiding and retaining means.

In order to make the device easier to use, the invention proposes that the movement of the guiding and retaining means between the retaining position and the removal position comprises a rotational movement.

This rotational movement, distinct from the sliding movement of the console, makes it possible to reduce the risk of involuntary release of the console with respect to the slideway.

In order to reduce this risk even further, the invention proposes that the guiding and retaining means are movable between the retaining position and the removal position only in a specific zone or zones along the slideway.

According to a complementary feature, the invention proposes that:
  the lateral opening has at least one sliding zone having transversely to the longitudinal direction a substantially constant width, and a removal zone of greater width, transversely to the longitudinal direction,
  the guiding and retaining means comprise a runner of non-circular section pivoting within the slideway between said relative retaining and removal positions,
  in the retaining position, the guiding means have a width greater than that of the lateral opening, including in the removal zone,
  in the removal position, the guiding means have a width between the width of the lateral opening in the sliding zone and the width of the lateral opening in the removal zone.

As a result, the removal of the console cannot take place if the runner is placed by the user in a retaining position, irrespective of the sliding of the console with respect to the slideway. Moreover, even if the runner is placed in the removal position, it is still necessary for it to be brought into the removal zone to release the console. This makes it possible to reduce further the risk of separation of the console from the slideway due to incorrect operation or to the intervention, unwanted by the user, of children "playing" with the device.

To fulfil these functions effectively, both in the retaining position and in the removal position, the runner will advantageously have a substantially rectangular shape.

In order to make the device even easier to use, the invention proposes that:
  the guiding and retaining means further comprise a control rod linked at one of its ends to the runner and passing through said lateral opening, and
  the control rod has opposite the lateral opening a non-circular section of a width substantially equal to the width of the lateral opening in the sliding zone, in order to prevent the rotation of the guiding and retaining means relative to the slideway in said sliding zone.

Thus, as long as the runner is opposite the sliding zone it remains in the position in which it has been placed, in the retaining position or the removal position, and it can be displaced from one position to the other when it is opposite the removal zone.

In order to make the device even easier to use, according to an advantageous feature of the invention, the control rod passes through the central console, such that the guiding and retaining means can be manipulated easily both to slide the console and to remove it.

In order to maintain the console in a specific position along the slideway, the invention proposes that the device comprises indexing means comprising:
  holes disposed in the slideway and distributed in the longitudinal direction, and
  an indexing rod linked to the guiding and retaining means and movable between an active position in which it is inserted into the holes of the slideway, and a retracted inactive position permitting sliding in the longitudinal direction between the guiding and retaining means and the slideway.

The invention further proposes advantageously that:
  the control rod is hollow and receives internally the indexing rod,
  the control rod and the indexing rod are each connected to a control handle, which control handles slide one in the other.

Thus, it is easy to retract the indexing means, slide the console and control the guiding and retaining means.

In addition, the invention proposes, in order to prevent rotation of the console about the guiding and retaining means, that the device further comprises at least one lug linked to the central console and sliding in the slideway.

The invention will become clearer from the following description, provided with reference to the appended drawings.

DETAILED DESCRIPTION OF THE PREFERRED EMBODIMENT

Figure 1:
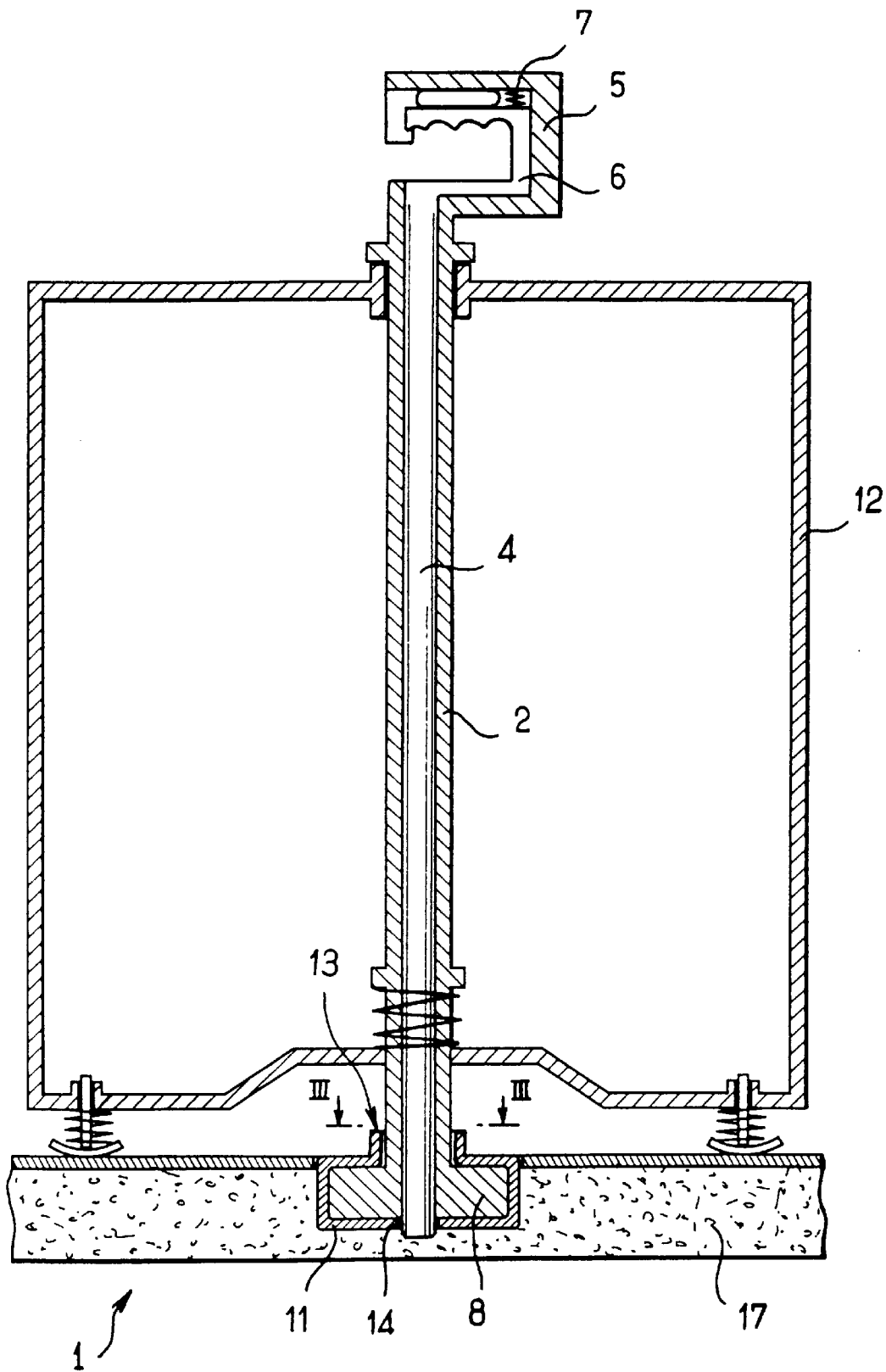
FIG. 1 is a diagrammatic view in median section of a device according to the invention.
Figure 2:
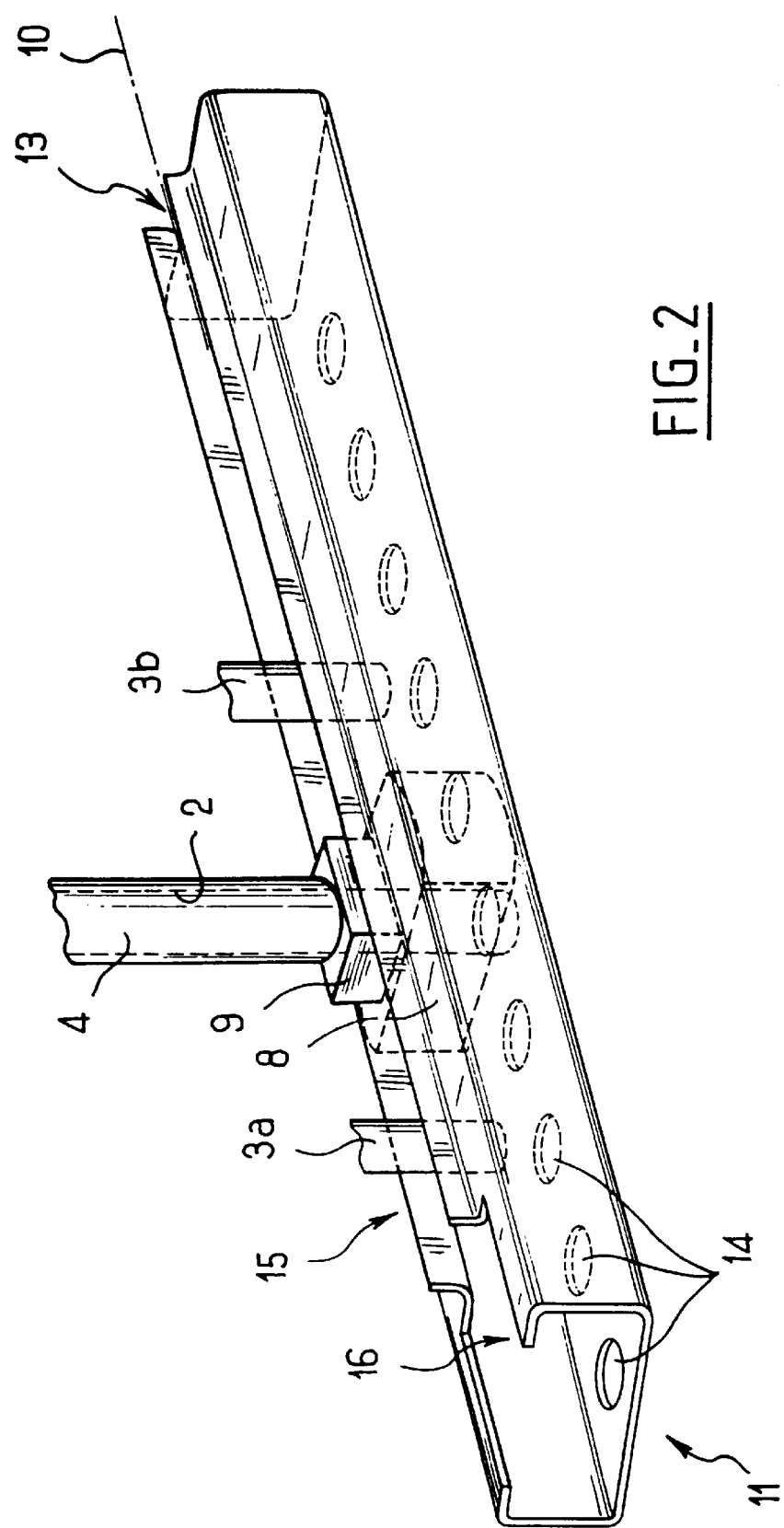
FIG. 2 is a perspective view of the guiding and retaining means of the device of the invention.
Figure 3:
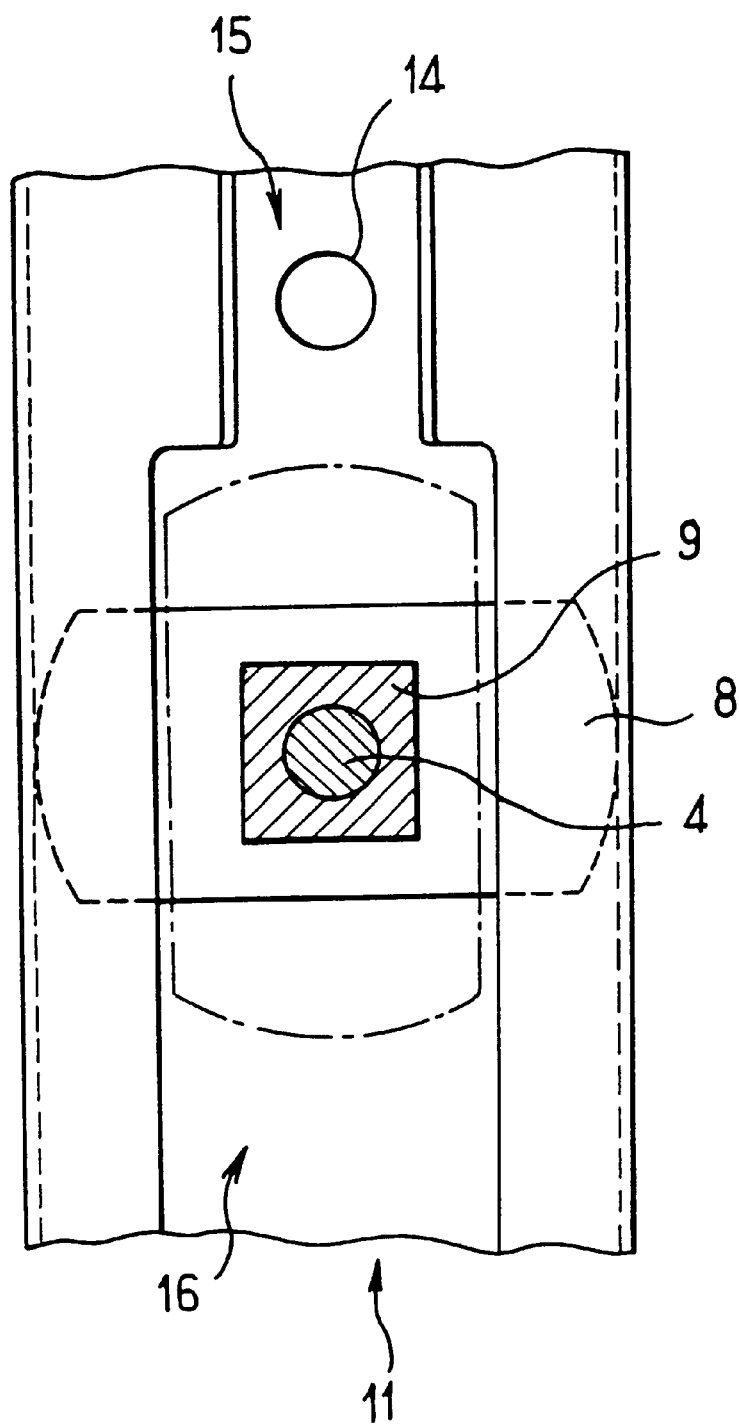
FIG. 3 is a sectional view of the device along the line III—III in FIG. 1.

FIGS. 1 to 3 illustrate a device 1 essentially comprising a central console 12, a slideway 11 and guiding and retaining means defined here by a carriage or runner 8 sliding within the slideway 11 and disposed at the end of a tubular control rod 2.

The slideway 11, embedded in the floor 17 of a vehicle, extends in a direction of elongation 10 and has laterally an opening defining a groove 13 also extending in the direction of elongation 10. The groove 13 comprises a sliding zone 15 and a removal zone 16 of greater width, perpendicularly to the direction of elongation 10.

The assembly of control rod 2 and runner 8 is movable in rotation with respect to the central console 12 on an axis perpendicular to the sliding direction 10. As illustrated more precisely in FIG. 2, this assembly further has a portion 9 of substantially square section disposed opposite the groove 13 the width of which is such that said assembly, and more precisely its portion 9, is blocked in rotation by the rib 13 when it is opposite the sliding zone 15 and is free to rotate within the slideway 11 when it is opposite the removal zone 16, as illustrated more precisely in FIG. 3.

The runner 8 is substantially rectangular. It has a length greater than the width of the groove 13, including in the removal zone 16, such that when it is disposed in the retaining position, transversely to the direction of elongation 10, it is maintained within the slideway 11 whether it is opposite the sliding zone 15 or the removal zone 16. On the other hand, its width is between the width of the groove 13 in the sliding zone 15 and the width of the groove 13 in the removal zone 16. Thus, when it is disposed in the removal position, in the direction of elongation 10, as shown by dash/dotted lines in FIG. 3, it is maintained within the slideway 11, if it is located opposite the sliding zone 15, and can pass through the slideway 11 if it is located opposite the removal zone 16.

The hollow control rod 2 passes through the central console 12 and has at its upper end a control handle 5. The hollow rod 2 encloses an indexing rod 4 sliding within the hollow rod 2 and, similarly, the control handle 5 encloses a control handle 6 associated with the indexing rod 4, sliding within the control handle 5, such that the control handles 5, 6, the control rod 2 and the indexing rod 4 rotate together within the console 12.

The central rod 4 is movable between a locked position in which its opposite end from the control handle 6 engages in indexing holes 14 provided in the slideway 11, opposite the groove 13, and a sliding position in which the central rod 4 is disengaged from the indexing holes 14. When the central rod 4 is in the locked position, it blocks the central console 12 in a given position. When the central rod 4 is in a sliding position, it releases the central console 12 and allows it to slide along the slideway 11 guided by the runner 8. A compression spring 7, disposed between the control handles 5 and 6, tends to bring the indexing rod 4 into the locked position.

The device further comprises two lugs 3a, 3b linked to the central console 12, disposed on each side of the guiding and retaining means 2, 8 and engaging in the groove 13 to prevent the central console 12 from pivoting about them.

What is claimed is:
1. A device for a passenger compartment of a motor vehicle, comprising:
   a central console,
   a slideway intended to be fixed to the passenger compartment of the vehicle extending in a longitudinal direction of elongation and having a lateral opening also extending in that longitudinal direction,
   a guiding and retaining means sliding within the slideway, said guiding and retaining means extending through said lateral opening and being linked to the console, wherein said guiding and retaining means are movable with respect to the slideway between a retaining position in which they are maintained within the slideway and a removal position permitting disconnection from the slideway by passing through said lateral opening.
2. The device according to claim 1, wherein the movement of the guiding and retaining means between the retaining position end the removal position comprises a rotational movement.
3. The device according to claim 2, wherein the guiding and retaining means are movable between the retaining position and the removal position only in a specific zone or zones along the slideway.
4. The device according to claim 3, wherein:
   the lateral opening has at least one sliding zone having transversely to the longitudinal direction a substantially constant width and a removal zone of greater width, transversely to the longitudinal direction,
   the guiding and retaining means comprise a runner of non-circular section pivoting within the slideway between said relative retaining and removal positions.
   in the retaining position, the guiding and retaining means have a width greater than that of the lateral opening, including the removal zone,
   in the removal positions the guiding and retaining means have a width between the width of the lateral opening in the sliding zone and the width of the lateral opening in the removal zone.
5. The device according to claim 4, wherein the runner is substantially rectangular in shape.
6. The device according to claim 4, wherein:
   the guiding and retaining means further comprise a control rod linked at one of its ends to the runner and passing through said lateral opening, and
   the control rod has opposite the lateral opening a non-circular section of a width substantially equal to the width of the lateral opening in the slide zone, in order to prevent the rotation of the guiding and retaining means relative to the slideway in said sliding zone.
7. The device according to claim 6, wherein the control rod passes through the central console.
8. The device according to claim 1, wherein it includes the position indexing means for immobilising the console, comprising:
   holes disposed in the slideway and distributed in the longitudinal direction, and
   an indexing rod, linked to the guiding and retaining means, movable between an active position in which it is inserted into the holes of the slideway and a retracted inactive position permitting sliding in the longitudinal direction between the guiding and retaining means and the slideway.
9. The device according to claim 6, wherein it includes position indexing means for immobilising the console, comprising:

holes disposed in the slideway and distributed in the longitudinal direction, and an indexing rod, linked to the guiding and retaining moans, movable between an active position in which it is inserted into the holes of the slideway and a refracted inactive position permitting sliding in the longitudinal direction between the guiding and retaining means and the slideway and wherein:

the control rod is hollow and receives Internally the indexing rod, the control rod and the indexing rod are each connected to a control handle, which control handles slide one in the other.

10. The device according to claim 2, wherein it further comprises at least one lug linked to the central console and sliding in the slideway in order to prevent the rotation of the console about the guiding and retaining means.

* * * * *